United States Patent [19]

Chueh

[11] 4,356,549
[45] Oct. 26, 1982

[54] SYSTEM PAGE TABLE APPARATUS

[75] Inventor: Richard J. Chueh, Cardiff, Calif.

[73] Assignee: Control Data Corporation, Minneapolis, Minn.

[21] Appl. No.: 136,731

[22] Filed: Apr. 30, 1980

[51] Int. Cl.³ .............................................. G06F 9/36
[52] U.S. Cl. ................................................. 364/200
[58] Field of Search ... 364/200 MS File, 900 MS File

[56] References Cited

U.S. PATENT DOCUMENTS

| | | | |
|---|---|---|---|
| 3,675,215 | 7/1972 | Arnold et al. | 364/200 |
| 4,128,875 | 12/1978 | Thurber et al. | 364/200 |
| 4,215,402 | 7/1980 | Mitchell et al. | 364/200 |
| 4,218,743 | 8/1980 | Hoffman | 364/200 |
| 4,279,014 | 7/1981 | Cassonnet | 364/200 |

Primary Examiner—Gareth D. Shaw
Assistant Examiner—Stephen A. Soffen
Attorney, Agent, or Firm—Edward L. Schwarz

[57] ABSTRACT

In this apparatus for dynamically translating virtual memory addresses to real memory addresses, a master system page table maintained in a memory associates real memory addresses with their corresponding system virtual memory addresses. This table is organized with each virtual memory address stored in it at an index location which is a smaller value formed as a predetermined function of the virtual memory address value. The translator forms the index from the virtual memory address according to the function, enters the table with it, and extracts the corresponding real memory address. In a preferred embodiment, every process (i.e., job) may reference any address in any segment of a process virtual address space, and a dedicated mechanism converts such a process virtual address reference to a system virtual memory address, which then is converted to the real memory address.

3 Claims, 3 Drawing Figures

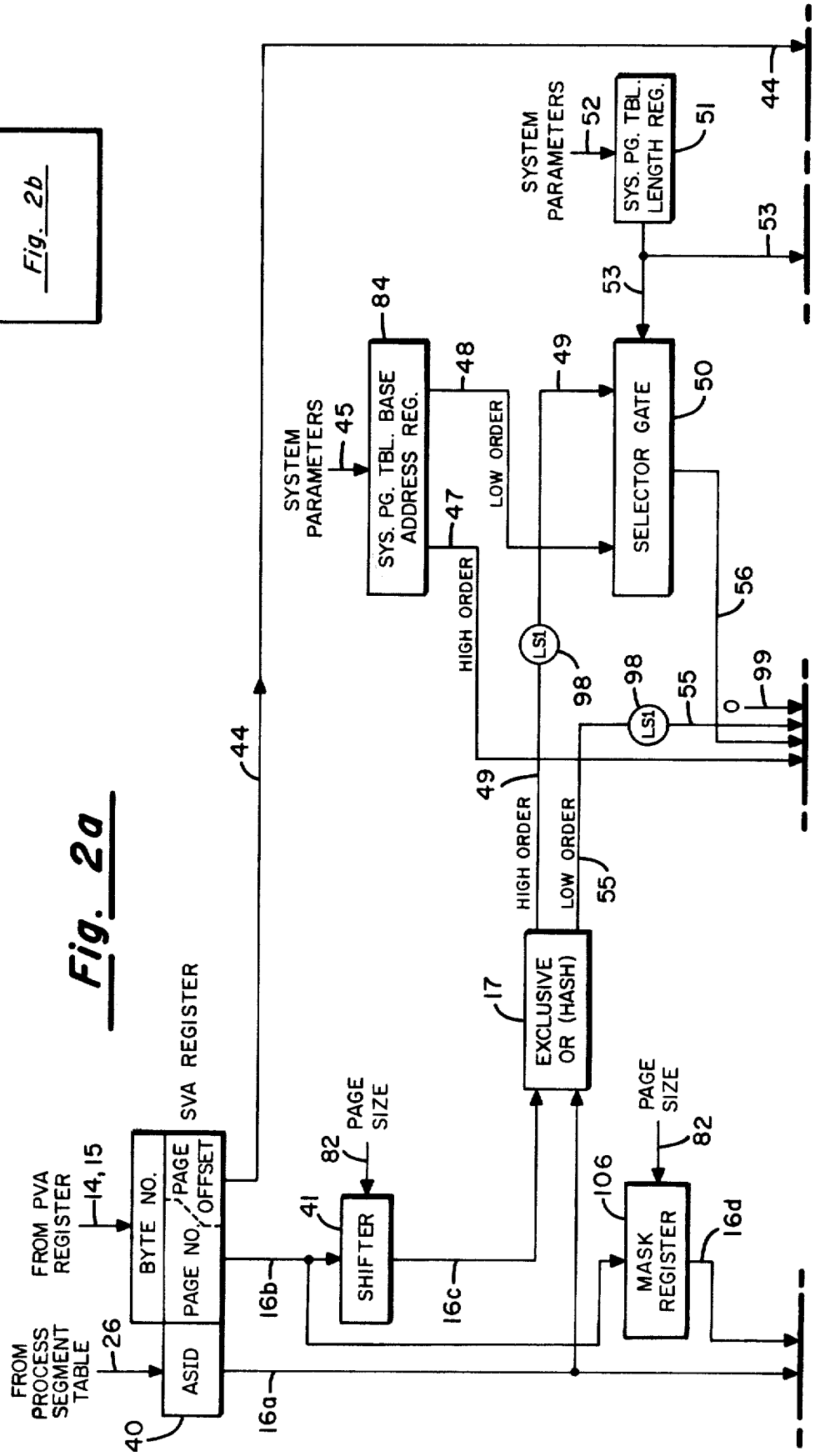

SYSTEM PAGE TABLE APPARATUS

BACKGROUND OF THE INVENTION

In the digital computing arts, it is useful to employ memory addresses which are larger than the actual address range of the memory in which the program is stored during execution. Hardware in the machine translates such virtual memory addresses into corresponding real memory addresses during execution of the program. *Introduction to Virtual Storage in System/370*, IBM, 1972 (available from "the IBM Branch Office serving your locality") describes one virtual memory address translation scheme in current use. To briefly summarize its contents, the term "virtual memory" refers to an addressing scheme in which individual programs are allowed to have legal, valid addresses much larger than the largest address of the computer's real memory. The computer's instruction format is designed with address fields large enough to hold the largest virtual memory address. The computer's hardware is designed to translate the virtual addresses into real memory addresses by use of a system of tables. Each program is broken up into one or more segments of equal predetermined size. Each segment is broken into pages, equal in length for all segments. A particular page of virtual memory may or may not at a given time be in real memory, where it must be located during execution. If it is in real memory, it may be located in any one of the available page locations. The page locations or frames, in real memory, which contain individual pages have real memory addresses bearing no relationship to the virtual memory addresses of the various pages which occupy them at a given time. In fact, a page frame of real memory will usually, during execution of a program, at different times contain many different pages, each having different virtual addresses. The virtual memory address of a page is related to the address of a page in real memory by the page table. Each segment has a separate page table for its pages.

When a virtual memory address is converted to a real memory address, the page table for that segment is inspected. The entry for the desired page will contain the real memory address of that page, if that page is in real memory. If it isn't, than that page's absence is indicated by an invalid bit, and the computer reads the page from external memory into an available page frame in real memory. To convert a virtual address to the desired real memory address, the computer uses the segment number in the address to enter a segment table associated with that program from which the location of the page table is determined. The page table is entered with the page number as index to determine the real starting address of the page in real memory. To this address is added the intra-page displacement, which completes the addressing function. As is explained in *Introduction*, many other improvements on this basic scheme have been devised which improve its speed and ease of use.

Another part of the prior art which relates to this invention is the so-called hashing technique used in table organization and table lookup. Hashing involves storing entries in a table at index locations which are smaller than but functionally related to the numeric value of the entry itself, useful when maintaining a large, sparsely filled table. Thus the large table can be stored in a substantially smaller storage space. Indices to such a large table can have any value within the table's size, and hashing maps them into the smaller table. It's best to choose the size of the hashed entry table such that it is never more than $\frac{1}{2}$ filled at most, with $\frac{1}{4}$ or $\frac{1}{8}$ a better ratio, particularly if the hashing algorithm does not produce totally random values. If the unhashed table is 1% filled at maximum, e.g., then the size of the hashed table should be chosen no more than 50 times smaller. The mathematical function used to change the unhashed table index to the hashed table index should be such that the hashed table indices have as random a distribution as possible. There are many mathematical functions which can be used, such as a preselected exclusive OR function which combines selected portions of the unhashed index known to be random, or a pseudo-random mathematical function generator using the unhashed index as the argument.

Not infrequently, any algorithm which maps a larger number of indices to a smaller according to some present algorithm, will produce an identical smaller index. The preferred and simplest rule then when constructing the hashed table is simply to use the unoccupied location in the hashed table having the smallest larger index. Other algorithms for selecting the next in a series of such conflicting entries are possible but not desirable because they are slower, more confusing, or more complex. This preferred algorithm requires that each occupied location must have some indication of occupancy. As soon as an unoccupied location in the hashed table is found, the new entry is inserted in this location with its unhashed index, and its indication of occupancy, which may be the entry itself, is set. Thus, each initial index generated by the hashing algorithm can be considered to simply define a contiguous series of table locations, each containing an entry which may be the desired one (from which the initial index was generated). The start of this series is defined by the initial index. The last entry is indicated by a following unoccupied location or a flag in the last entry. When referencing such a table, the table-creating algorithm with the unhashed index as its argument is used to specify the contiguous series by computing the initial index, from which the hashed table is searched forward. A find is indicated when the unhashed index stored in the hashed table equals the unhashed index whose searched-for table entry is desired. The algorithm governing construction of the table guarantees that if the desired entry is not in the specified contiguous series, the desired entry cannot be in the table.

If the table is only partially filled the desired entry can usually be found quickly. For example, a hashed table one-third filled in a random fashion will provide the desired entry 89% of the time after a maximum of only two entries in the table have been inspected. The hashed table should be left predominantly empty to reduce search time. Significant memory space can be saved in certain circumstances at only a slight increase in processor time by the use of hashing.

BRIEF DESCRIPTION OF THE INVENTION

In a virtual memory system, such as IBM's described above, a large number of segments exist, each with a page table which may have 16, 32, or more slots. Thus a considerable amount of the memory space is occupied by these tables. In general, only a few page tables are ever used and of those that are used, only a few slots are ever occupied. Nevertheless, it is necessary to maintain these tables at all times to provide the expected capabilities of the virtual memory addressing system. To avoid this wasteful use of memory, my invention provides for a single large system page table (SPT). The segment/page format is still retained, but no individual page tables for each segment exist. The segment/page number system for identifying each individual page is retained and instead is used as the unhashed entry to the larger (than an individual segment page table) SPT. The SPT is set up to have storage slots from 2 to 4 times in number that of the number of page frames in the real memory. The SPT can be conveniently contained in the real memory of the computer (preferred), or a separate dedicated memory section may be employed for this purpose.

The basic address format used by all programs and programmers in this addressing system is called a process virtual address (PVA) and comprises, for present purposes, a segment number and a byte number. The term "process" is given to each group of instructions and/or data which have independent existence within the computer, hence the name process virtual address. The precise function which this invention serves to accomplish is to correlate the page specified by the PVA with a page frame in real memory. When a memory access occurs, a PVA is presented to the addressing hardware, where the PVA is first stored in a PVA register. The PVA segment number is used to index the process's segment table (which is uniquely assigned to the process by and created by the operating system) to retrieve an active segment identifier (ASID). The PVA byte number comprises a page number and a page offset. The page number (PN) is catenated with (placed side by side) the ASID. The ASID-PN combination (segment/page identifier or SPID) is hashed by using it as the argument of a mathematical function to specify an index at which the SPT search for the desired SPID should begin. In effect, the hashing function hardware provides the beginning index of a contiguous series of at least one SPT location in which the desired SPID will be found if it is in the SPT. Flags in the SPT define the end of each series. Search hardware checks the contents of the locations in the series against the SPID value and if a match is found, the real memory address field stored in the SPT location at which the match was found, is catenated with the page offset to form the desired real memory address. If the table search hardware does not find the SPID in the specified series of SPT locations this implies that the page containing the process virtual memory address desired is not currently resident in real memory. A mechanism is provided which then properly inserts the page containing this address in real memory and updates the SPT. The address of the page frame in which this page is stored is inserted in the contiguous series indexed by the hashing algorithm, along with the unhashed value of the SPID. When an address in that page is again referenced, the SPID will be detected and the real memory address of the page supplied.

Accordingly, one object of this invention is to reduce the amount of real memory dedicated to page tables in a virtual memory addressing system.

Another object is to provide a common storage area for all the page tables created while a program is run on a virtual memory address computer.

Yet another object is to conveniently permit several independent processes to share one set of object code or data stored in real memory.

Other objects will become obvious in the following discussion.

BRIEF DESCRIPTION OF THE DRAWINGS

FIGS. 2a and 2b are a detailed block diagram of apparatus incorporating the preferred embodiment of the invention, and together comprise FIG. 2.

DESCRIPTION OF THE PREFERRED EMBODIMENT

Figure 1:
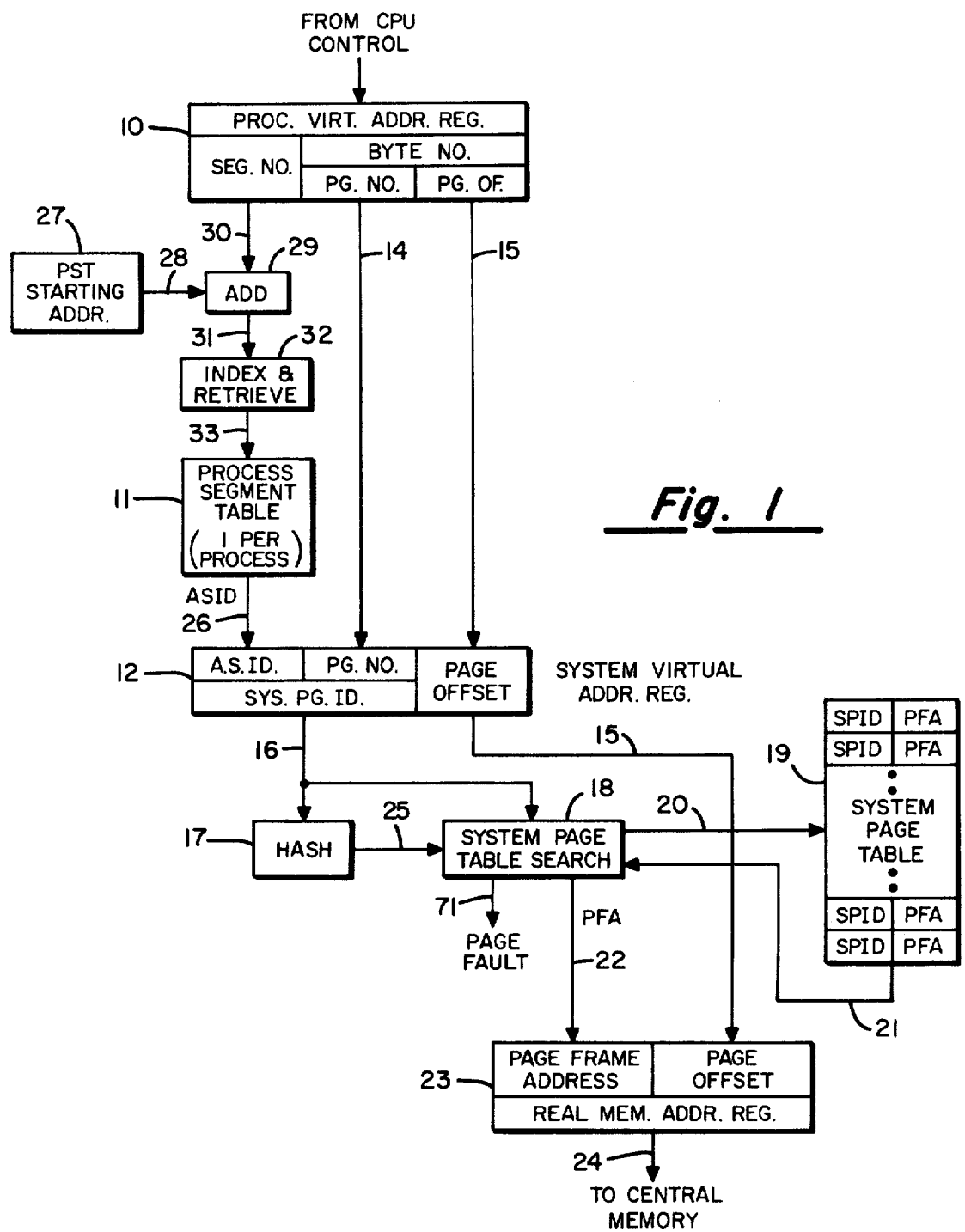
FIG. 1 is a block diagram generally disclosing the operation of apparatus incorporating this invention.

Refer first to FIG. 1, which shows a simplified block diagram displaying an embodiment incorporating the general elements of the invention and its integration with other parts of a computer's virtual to real address conversion. In the use of this apparatus, an identifiable program which is self-contained as to its instruction list is called a process. The basic address format used by a process to address memory is called a process virtual address, and may be either the location of instructions or the location of data. When a process virtual address (PVA) is encountered during instruction processing, control hardware (not shown) stores it in the process virtual address register 10. As shown in PVA register 10 a PVA, for purposes of understanding this invention, comprises two parts, a process segment number and a byte number. The byte number is further subdivided into a page number and a page offset. Each process segment number value must be unique within its associated process, but need not be unique (and usually isn't) within the entire system. A process segment number can have any convenient maximum value. Preferred sizes are 11 or 12 bits, or 2,047 or 4,095 maximum value. Process segment numbers are assigned by control software during precomputation setup consecutively starting at 0. Maximum process segment number size is usually fixed for a given hardware design.

As stated earlier, the byte number is further subdivided into a high order page number, and a page offset or intra-page address. During implementation of the address conversion in this simplified embodiment, the page offset can be neglected since it is carried through unchanged and simply catenated to the final result. (In the embodiment of FIG. 2 with variable length page offset, this will not be precisely true.) As with the segment number, the byte number can have any convenient maximum size, in this preferred embodiment being chosen as 31 bits. Within the byte number, the page number can again have any convenient maximum size. In my preferred embodiment, the page number has a variable size ranging from 15 bits at the smallest to 22 bits at the largest. The problem of a variable page number size will be discussed in more detail in conjunction with the preferred embodiment shown in FIG. 2.

The PVA in PVA register 10 is converted to a real memory address in 2 major steps. First, the PVA involved, which is unique to the process only, is converted to a system virtual address (SVA), which is unique to the system. The segment number from the PVA is transmitted on path 30 to one input of add module 29. Each process has associated with it a single process segment table (PST) 11. The PST stores the unique portion of the SVA, the active segment identifier (ASID), as an argument of the process segment number. The same ASID may have a different process segment number in each PST, since each process is totally independent of other processes. The ASID value of 0 is reserved to indicate an empty system page table location, to be discussed later. In addition to the ASID, each PST 11 stores other information associated with the protection and access rights of the process to the segment. The PST 11 associated with each process is preferably stored in central memory in consecutive locations beginning at an address unique to that process. During pre-execution setup for a process, control software loads this address into PST starting address register 27. The length of each PST 11 will vary depending on the number of segments in the process. Since a user may erroneously specify a segment number in the process, it is useful to record the length of each PST and refuse to honor a PVA specifying a non-existent segment.

During PVA to SVA conversion, the PST starting address register 27 contents are transmitted on data path 28 to a second input of add module 29. The segment number from PVA register 10 is added to the PST starting address by add module 29. This sum is supplied on path 31 to index and retrieve module 32, which actually generates the memory reference for entering PST 11 and extracting the ASID assigned to the segment number in PVA register 10. This PVA to SVA conversion apparatus can be implemented in either hardware or firmware. Because operation speed in this area is of critical importance, I prefer the hardware approach, but for reasons of economy, small systems using my invention might well prefer firmware with its potential for cost savings.

The ASID is transmitted to the upper bits of SVA register 12 on data path 26. The page number from PVA register 10 is transmitted on data path 14 to the lower order bits of SVA register 12. Within SVA register 12, the ASID and the page number are catenated to form the SPID with the ASID forming its higher order bits and the page number forming its low order bits. Each segment/page identifier (SPID) forms an operating system-wide page identifier which somewhat resembles a page number described in the IBM *Introduction*, supra. The SPID together with the page offset (path 15) form the SVA. Because of the variable length page number in the preferred embodiment, page number and page offset must be transmitted together until separated, as will be explained in conjunction with FIG. 2.

One should understand that more than one segment, each having a different segment number and from a different process, may share the same ASID. This only implies that each of such processes executes the same set of instructions. This is consistent with the philosophy that instructions should not be altered within the system, and that any particular set of instructions should be available for use by any process. For example, if the computer involved is the CPU for a large number of interactive display terminals, it is very likely that a significant amount of commonality exists between the programs or processes required for response to the human input through these terminals. It is of course wasteful to require individual programs or instructions for each such terminal. It is instead preferable that common programs appear but once within the core memory and be available to all processes for users. My approach in this invention allows a means to partition or isolate individual processes from each other and at the same time allows them to share object code in this fashion.

Simpler systems may employ the SVA directly as the virtual address, the addressing mechanism having no PVA to SVA conversion. Many of the above advantages will not be available in such an implementation, but for such simpler systems this may be no great loss, and gain substantial simplicity.

The SPID in register 12 and on path 16 is converted to a preliminary index to SPT 19 by hashing module or index generator 17 using one of the hashing algorithms previously described. The hashing algorithm I prefer for hashing module 17 is to exclusive OR the ASID with a selected number of the low order page number bits. Because of the possibility of less than randomness in the lowest order page number bits, more than one ASID and page numbers associated with them may hash to the identical sequence of SPT entries. The proposed hashing algorithm is modified by multiplying the preliminary index by a small integer greater than 1, preferably 2 or 4, to form the initial index and thereby at least partially avoid creating a long string of consecutive entries. In one preferred embodiment, the result of the exclusive OR is left shifted by 1 (multiplied by 2) to deal with this problem. The output of hashing element 17 is supplied on path 25 to SPT search module 18. SPT search module 18 also receives the SPID on path 16 from SPID register 12. SPT 19 is stored in central memory and is preferably created and maintained by software in the operating system. Each valid entry in SPT 19 contains an SPID and a corresponding page frame address (PFA) specifying the real memory address of the page frame containing the page identified by the SPID. Each valid entry in SPT 19 is stored in the SPT at the index location which is the hashed value of the SPID in the entry or at a location closely following. The hashing algorithm used to originally insert these SPID's in their proper location in SPT 19 is of course the same hashing algorithm employed by hashing element 17.

SPT search module 18 sequentially examines SPT entries starting with the initial index furnished by hashing element 17 on data path 25. Each sequential index used to reference real memory generates the corresponding SPT entry supplied to SPT search module 18 on data path 21. The SPID of the SPT entry so supplied is compared with the SPID stored in the SPID portion of SVA register 12. If not equal, the next SPT entries in sequence are examined. If equality is detected, then the page frame address (PFA) stored in that SPT entry is the desired PFA and is supplied on data path 22 to real memory address (RMA) register 23. The page offset on data path 15 from PVA register 10 is catenated to the PFA to form the real memory address (RMA) described. With this creation of the real memory address, which is then supplied to central memory on data path 24, the PVA to RMA conversion algorithm is complete.

Although the preceding explains the address conversion procedures, several other considerations are also present. One of these is the situation where the desired page is not stored in real memory. This is indicated either when a block of SPT locations of predetermined number and starting with the initial index have been examined, or when a flag in SPT 19 which indicates the last possible entry is detected during the search. The flag may be simply a bit in each SPT entry set by the operating software which maintains the SPT. Search module 18 produces a page fault signal on data path 71 responsive to either search of the entire block or detecting such a flag. Control system software not shown is signalled by the page fault. This software accesses an external memory containing an image of the desired page identified by the contents of SPID register 12 and loads the desired page into an empty real memory page frame. The contents of SPID register 12 and the beginning real memory address of the just-filled real memory page frame are then stored in the first empty entry in SPT 19 of the series of entries starting with the initial index. The flag indicating the end of the hashed entry series is moved if making the entry changes the end of the series.

But this operation itself has further ramifications. If real memory is already completely filled, then it is necessary to remove a page from real memory. This is discussed in some detail in *Introduction*, supra, but a word can be said about it here. First of all, it makes no sense to remove a frequently used page from memory, so it is useful if some indication of usage of each page is contained in SPT 19. This can be simply a single bit in each SPT entry which is cleared automatically at regular intervals and then set every time a reference is made to that page. By occasionally examining each of these bits, likely candidates for deleting from SPT 19 and real memory can be detected by their cleared reference bits. When a page is removed from real memory and stored in back-up memory if it has been altered, its entry in SPT 19 must be deleted as well. This can be done under either hardware or software control. The procedures involved are not part of this invention, though.

It is important when the SPT is being built or maintained that only a few SPID values in it form any one index when they are hashed. If such a condition is not imposed, SPT searching becomes very slow when referencing those of such pages last inserted in real memory. One solution is to delay processing of jobs having such SPID's until some have been completed. Techniques for assuring SPID randomness are available and will be discussed later; they prevent bunching of SPT entries.

To prevent lengthy searches of SPT 19, it is necessary, as explained supra, to have a substantially larger number of locations in SPT 19 than there are page frames within the real memory. Preferably, never more than ¼ of the SPT is occupied by valid entries. Since the number of page frames available within real memory is known at the time the page and memory size are selected, SPT length can be easily determined, taking into account real memory area devoted to operating system functions and hence not available for process storage.

Figure 2B:
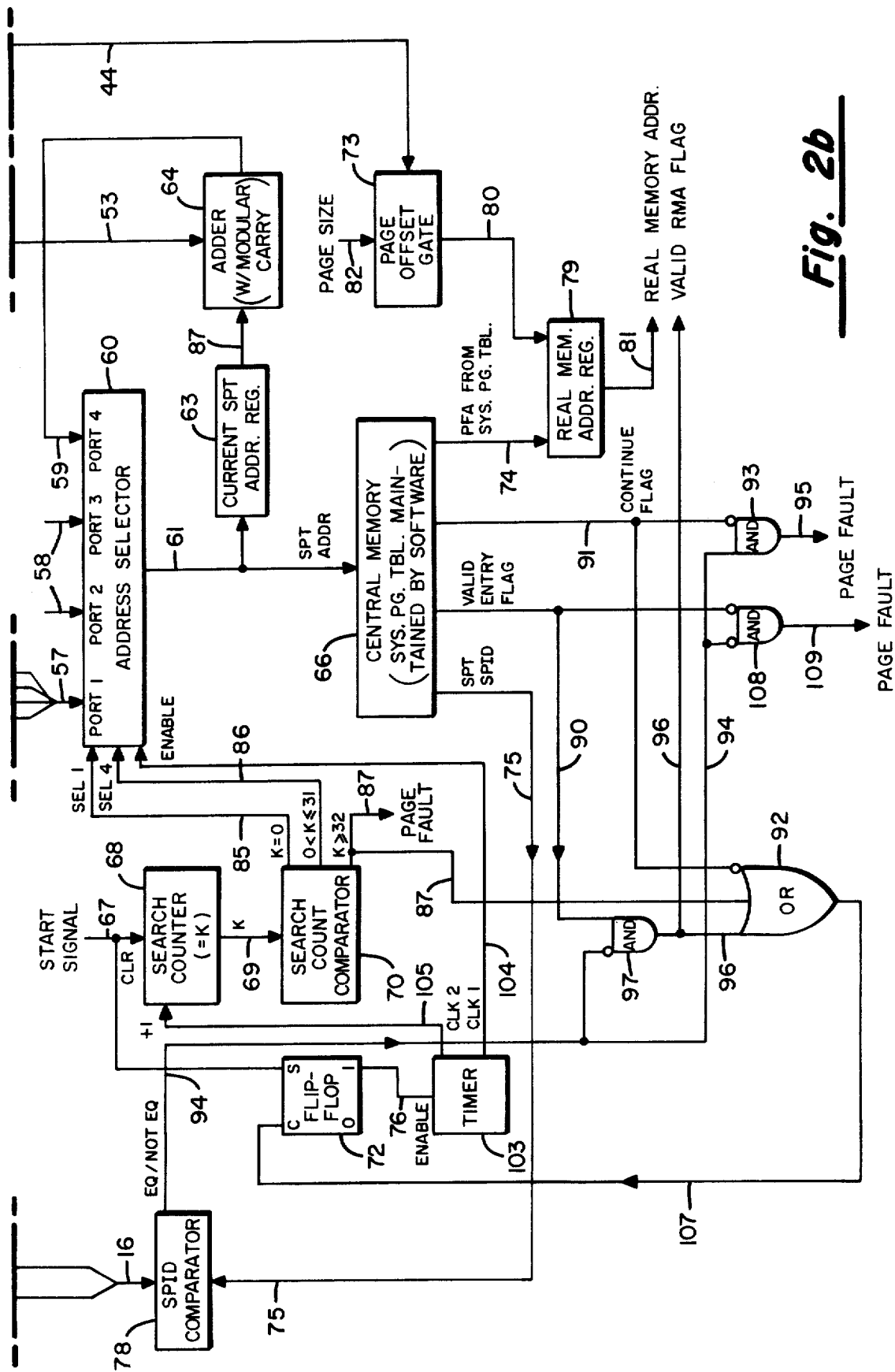

FIG. 2 has been broken up into 2 pages, FIGS. 2a and 2b. The preferred embodiment shown in FIG. 2 focuses on the manipulations of the ASID (FIG. 1) on path 26 and the byte number from PVA register 10 on path 14 (page number) and path 15 (page offset). The PVA and SVA conversion is relatively simple, and has been dealt with adequately in connection with FIG. 1. One skilled in the art will realize from even a cursory inspection of FIG. 2 that important sequencing controls are not shown on it. I believe that such a one skilled in the art can supply needed timing logic, particularly with the assistance of the description which, in the following pages, will allude to any timing which is important in the functioning of the various elements. I believe that addition of further timing logic would only obscure and confuse the understanding of this embodiment.

First briefly discussing process segment tables 11, note again that their genesis is during setup for execution of a process. Information for the creation of each may come from either data supplied with the process itself, or from the system itself for segments which are maintained for usage systemwide. They may be stored anywhere, but the base address of each is stored in PST starting address register 27 while the corresponding process is being executed. To conserve processor time, a number of segment numbers are stored versus their corresponding ASID's in high speed lookaside or associative registers which are loaded at the first reference to a segment referenced in a PVA. The prior art is replete with means for handling and creating such tables, so no further explicit discussion of this aspect is needed.

In the preferred embodiment, a substantial amount of effort is devoted to reducing computer time spent to effect each virtual to real address conversion. System virtual address (SVA) register 40 is roughly equivalent to SVA register 12 of FIG. 1, but incorporates additional capabilities to deal with a variable page number size. In the preferred embodiment, the byte number portion of the PVA and the SVA is 31 bits long. Of that, the page number occupies a minimum of the upper 15 bits of the byte number, to a maximum of the upper 22 bits of the byte number. The page offset occupies those portions of the byte number not part of the page number, and thus may be from 9 to 16 bits long.

To perform the hashing operation, it is necessary to separate the page number from the page offset. This is performed by transmitting on data path 16b to shifter 41, all bits of the byte number which can possibly contain a page number, or in the preferred embodiment, the high order 22 bits of the byte number. Shifter 41 right shifts its contents end off the number of bits, dependent on the page size data on data path 82, necessary to right justify the page number. The page size on path 82 can be set only when initializing the system. Hence, if it is maintained under software control, it should be set during system startup and not changed thereafter. An alternative is to design the hardware involved in this area so as to permit manual setting of page size in some fashion prior to system startup. Page size may be stored or expressed most conveniently as an index specifying the number of right shifts which the page number data transmitted on path 16b must undergo to right justify the page number in shifter 41. For example, with a maximum number of page number bits in the byte number of 22, and an actual page number of 18 bits, the page size signal on data path 82 should provide a right shift signal of 4 bits to shifter 41. The output of shifter 41, the right justified page number, is supplied on path 16c to exclusive OR logic element 17 and SPID comparator 78. The ASID portion of SVA register 40 is supplied on data path 16a to both exclusive OR logic element 17 and SPID comparator 78 (FIG. 2b). The ASID forms the left, and the right justified page number forms the right, part of the SPID against which the system page table (SPT) is searched.

The preferred hashing algorithm forms the exclusive OR of the ASID on path 16a with the right justified page number on path 16c, multiplies by 2 and then uses as many of the low order bits of the result as are necessary to form the initial index for searching the SPT. In the preferred embodiment, the SPT length is a power of 2; thus by selecting the corresponding number of low order bits from the output of exclusive OR logic element 17, an index capable of referencing any even location for any SPT size is formed. This function is, in fact, performed by selector gate 50 and its inputs. SPT base address register 84 stores the base address of the SPT in central memory 66 in the preferred embodiment. Rather than storing the SPT in a separate memory specifically dedicated to such storage, the SPT is kept in central memory 66, a simpler, cheaper and more flexible alternative. SPT base address register 84 is loaded with the SPT base address via path 45 in some fashion, during system startup; the initial index is in effect added to it by selector gate 50 to form each initial SPT search address. There is no reason why the location of the SPT cannot be changed after system startup has occurred, but in practice there appears to be very little advantage in providing this flexibility, and hence this parameter, with page size, may be also considered fixed. The length of the SPT is provided in similar fashion on data path 52 to SPT length register 51.

In the preferred embodiment, several conventions are employed in this area. The SPT length register 51 preferably contains a quantity equal to or in some other way specifying SPT length as a power of 2. Secondly, the SPT's base address is chosen to be some multiple of the SPT length; thus the number of its contiguous low order zero bits is equal to the power of 2 in SPT length register 51 defining the length of the SPT. By adopting these conventions, selector gate 50 can form the initial SPT search address by simply catenating the SPT index in its low order bit positions to the high order base address bits.

The initial SPT search address, or initial index, is a function of the ASID on path 16a and the page number on path 16c. Exclusive OR element 17 receives these 2 inputs and produces their bit by bit exclusive OR. There are 2 outputs of exclusive OR logic element 17. Both are connected to their destinations so as to provide a left shift by 1 of the data carried by them as denoted by left shift 1 symbols 98. Data path 55 carries those bits which always form the low order portion of the initial SPT search address regardless of the length of the SPT. Path 49 carries to the low order bit inputs of selector gate 50 those bits from exclusive OR element 17 which may or may not form a portion of the initial SPT search address, depending on the content of SPT length register 51. SPT base address register 84 also has 2 outputs, that on path 47 always forming the high order portion of the initial SPT search address, and that on data path 48, which is applied to the high order bit inputs of selector gate 50, possibly forming a portion of the initial SPT search address, again dependent on the contents of SPT length register 51. Because of the previously adopted convention that the SPT length will be a power of 2, it is merely necessary that selector gate 50 select sufficient low order bits from data path 49 and high order bits from path 48 so the total number of these selected bits plus those on data path 55 plus 1 (for the left shift) equal the power of 2 defining the SPT length. Selector gate 50 supplies these bits with the hashing operation value (data path 49) as the low order, and the SPT base address bits (path 48) as the high order, bits on data path 56. Because of this selection scheme, any bits from exclusive OR logic element 17 above the highest bit position specified by the contents of SPT length register 51 are ignored. Similarly, all bits in SPT address register 84 coinciding with selected bits on data path 49 are ignored. Thus the bits carried by data path 56 may be either all bits originating from exclusive OR element 17, or they may all originate from SPT base address register 84. More typically, however, a number of the low order bits from selector 50 will originate from exclusive OR logic element 17, and the remaining higher order bits will originate from SPT base address register 84.

The high order bits on path 47 from SPT base address register 84 not sent to selector 50 form the high order bits of data path 57 (FIG. 2b). Those bits from exclusive OR logic element 17 not applied to selector 50 form the low order bits of data path 57. Those bits which passed through selector 50, comprising the remaining bits of exclusive OR logic element 17 output and SPT base address register 54 output, and dependent on the length of the SPT, form the middle bits of data path 57. A 0 is supplied on path 99 to form the low order bit of path 57 to fill the bit position made vacant by the left shift of 1 applied to the output of element 17. The symbology of data paths 47, 55, 99 and 56 merging to form a single data path 57 simply reflects the different sources for various bits comprising data path 57.

Data path 57 is connected to PORT 1 of address selector 60. In this preferred embodiment, PORT 2 and 3 are used for data references to real memory, and are of no further concern in understanding this invention. Data presented at port 1 of address selector 60 is gated to data path 61 by a pulse on the ENABLE input, path 104, when PORT 1 select input SEL 1 is activated. Similarly, the address data on path 59 presented to PORT 4 of address selector 60 is placed on path 61 by an ENABLE pulse when PORT 4 select input SEL 4 is activated. Address selector 60 forms part of a control loop, implemented in hardware in this preferred embodiment, which performs the search of the SPT.

Operation of the control loop is initiated by issuance of a start signal on path 67 by the main computer control. This signal clears search counter 68 and sets flip-flop 72. Flip-flop 72 is set during the entire search operation of the control loop and is cleared only when the search is terminated when one of several conditions to be described later, occur. The "1" output of flip-flop 72 is applied to the ENABLE input of timer 103. When flip-flop 72 is set, the "1" output terminal produces a binary 1 output on path 76. A binary 1 signal on path 76 starts timer 103, which sequences through its clock phase pulses, CLK 1 and CLK 2 as long as its ENABLE input receives the 1 signal. The CLK 1 phase on path 104 enables address selector 60. The CLK 2 phase on path 105 advances search counter 68 by 1. The intervals between these two pulses are chosen long enough to allow the control loop functions required in each interval to complete under worst case conditions. Timer 103 may be a dedicated clock-type pulse generator. More frequently, however, the timer may comprise the main computer control clock, with gates which supply pulses from it to address selector 60 and search counter 68.

Address selector 60, together with current SPT address register 63 and adder 64 form an entry retrieval subsystem in this control loop. Search count comparator 70 controls the port of address selector 60 which is active, based on the contents K of search counter 68. Search count comparator 70 activates PORT 1 with a select retrieval signal on data path 85 if K is 0. If K is between 0 and 31 inclusive, a similar PORT 4 select retrieval signal is present on data path 86. If $K \geq 32$ is true, a page fault signal is placed on data path 87. In this preferred embodiment, the block of SPT locations in which the searched-for SPID will be found if at all, is 32 entries long. The CLK 1 signal on path 104 in conjunction with a simultaneous signal on the SEL 1 or SEL 4 input of address selector 60 functions as a retrieval signal and gates the data at input terminal PORT 1 or PORT 4 respectively to path 61.

The output of address selector 60 on data path 61 is applied to the address input of central memory 66, which causes individual fields of the SPT entry in the memory location so specified each to be presented on one of the output data paths 74, 75, 90 and 91. These, along with the SPID on path 16, form the inputs to an SPID comparison subsystem. The SPID at the specified central memory address is presented on data path 75 to one SPID comparator 78 input. The ASID from SVA register 40 on data path 16a and the unjustified page number from mask register 106 on data path 16d are combined into data path 16 and supplied to SPID comparator 78 as the SPID of the current SVA which is being converted. Mask register 106 uses the page size on path 82 to clear any page offset bits to the right of the page number. If the SPID from shifter 41 and SVA register 40 does not equal the SPT SPID on data path 75, a binary 1 signal occurs at the EQ/NOT EQ terminal of comparator 78 and is placed on data path 94. Timer 103 produces its CLK 2 phase pulse at a time after the CLK 1 pulse sufficient to allow the SPID from the SPT to be supplied to and compared by SPID comparator 78. The timer's CLK 1 phase pulses occur a sufficient interval after the ENABLE input initially appears on path 76 and after each CLK 2 phase pulse, to allow the proper values at the outputs of search count comparator 70 to be present before address selector 60 receives its ENABLE signal on path 104.

The CLK 2 output of timer 103 is applied on path 105 to the +1 input of search counter 68. Each CLK 2 pulse causes search counter 68 contents to be incremented by one, hence the +1 indication on this input. If the two SPID's received by comparator 78 are equal, then the EQ/NOT EQ output of SPID comparator 78 on path 94 changes from a 1 to 0 signal do indicate that the page SPID from SVA register address 40 equals the SPT SPID retrieved from central memory 66 during the most recent data retrieval operation.

Each time address selector 60 supplies a new address to central memory 66, it is necessary to advance the contents of current SPT address register 63 to prepare for a possible succeeding reference. Accordingly, when contents of search counter 68 is 0, the signal on data path 85 energizes the SEL 1 input of address selector 60, enabling PORT 1. The initial address at PORT 1 is formed, as was previously explained, from low order bits of exclusive OR logic element 17 output, high order bits of SPT address register 84 contents, and selector 50 output gated to the address input of memory 66. The address so generated is gated to path 61 and stored in current SPT address register 63. The contents of current SPT address register 63 is available on data path 87 to adder 64. Adder 64 adds to the address on path 87 the number of memory 66 words occupied by each SPT entry. Adder 64 also received the contents of SPT length register 51 on data path 53, which allows adder 64 to perform its addition in a special way. To allow consecutive locations in the SPT to be potential holders of the desired entry for any initial address, including those within 32 locations of the end of the SPT, adder 64 adds its increment to the address of the last entry in the SPT and produces the address of the appropriate entry in the beginning of the SPT. Accordingly, adder 64 performs a modular add which involves only the lower order bits specified by SPT length register 51. Take the case where SPT length register 51 specifies a 4,096 (10,000 octal) entry SPT and data paths 55 and 56 carry a 12 bit initial index. Assume 1 word per entry. If +1 is added to a current SPT address having 7777 (octal) as its low order 12 bits, adder 64 advances these low order 12 bits to 0000, without changing the value of the 13th or any higher order bit of the current SPT address in register 63.

The output of adder 64 is placed on data path 59 and held at the PORT 4 input of address selector 60. When a subsequent pulse is applied on path 105 to the +1 input of search counter 68 advancing K by 1, if $0 < K \leq 31$ energizing PORT 4, the address of the next entry in the SPT is gated from adder 64 on path 59 to central memory 66. The new entry from address 0000 is then produced on memory output paths 75, 74, 90 and 91. If $K \geq 32$, then a page fault signal on path 87 is produced.

As previously explained, during the course of execution of various time overlapped processes, or when a very large (spacewise) process is being executed, pages in real memory must be overlaid and obliterated by other pages. Of course, such obliterated pages must each have their entry in the SPT deleted. The mechanism to accomplish this which I prefer, is for the operating system to clear what I call a "valid entry" flag in the affected SPT entry. After a page in real memory has been unused for a time, page management software clears its valid entry flag and stores its SPT location in a free page queue recording the identity of pages available for overlaying. When a new page subsequently must be placed in real memory, one of the pages in the free page queue is purged from real memory and its page frame used for the new page. In the interim, between placing a page in the free page queue and its actual purging, the page itself is still available for reference in real memory.

When SPID comparator 78 detects equality between the SPT's SPID and the SVA's SPID the signal on the EQ/NOT EQ output path 94 changes from 1 to 0 to indicate this condition. The equal SPIDs binary 0 signal is applied to the true intput of AND gate 93 and the false input of AND gate 97. The valid entry flag signal on path 90 is applied to the true input of AND gate 97. A set valid entry flag in a SPT entry holding a SPID equal to the SVA SPID satisfies the two inputs of AND gate 97, placing a valid RMA flag on path 96. The real memory address on path 81 formed in RMA register 79 from the PFA on path 74 and the page offset from page offset gate 73 presented on path 80 is signalled to be correct to the main control logic by the set valid RMA flag output on path 96 from AND gate 97. Because of the variable size of the page offset, page offset gate 73 selects those low order bits of SVA register 40 which form the page offset, under the control of the page size input on path 82 (the same input to shifter 41). Gate 73 output then supplies the correct low order bits on path 80 to RMA register 79, completing formation of the RMA.

The output of AND gate 97 is also applied to one input of OR gate 92. OR gate 92 provides a clear signal on path 107 to the C (clear) input of flip-flop 72 whenever any of its 3 inputs are satisfied. Hence, the 1 from AND gate 97 causes a 1 to be applied on path 107 to the C input of flip-flop 72, clearing it. This causes the 1 on path 76 to change to an 0, disabling timer 103. This disabling occurs between the CLK 1 pulse which produced the equal SPID from the SPT and the CLK 2 pulse scheduled to occur just afterwards. Thus, this CLK 2 pulse does not occur nor do any other CLK 1 and CLK 2 pulses, halting the search operation until another start signal on path 67 occurs.

When comparator 78 detects equality between the SPIDs, but the valid entry flag on path 90 is 0, the search is halted. AND gate 108 receives the EQ/NOT EQ signal on path 94 and the valid entry flag on path 90 and inverts both at its inputs. Since each input is 0, the output is a 1 which indicates a page fault. This condition arises from the way in which paging is handled internally. At certain times pages are designated, on the basis of recent lack of use, as available for overlay by adding them to a free page queue and clearing the valid entry bit of each. They remain in memory however, pending such overlays, and can be reactivated if another reference to them occurs before overlay. Internal software which handles the paging deletes the page from the free page queue, and resets the valid entry flag in the SPT.

This software then causes another reference to the virtual addressing hardware, whereupon the PVA will be properly converted to a RMA. Without a valid entry flag for each active page, it would be impossible to determine which pages were in the free page queue, without inspecting the free page queue during each PVA to RMA conversion. Without valid entry flags, a decision to purge a particular page from real memory would be irrevocable even if another reference to it occurs prior to its actual removal from real memory and the SPT, unless the free page queue was inspected during each conversion. These gains must be balanced against the additional memory and hardware required in deciding to implement the valid entry flag mechanism.

When searching the SPT for a SPID, it is too slow to blindly search 32 sequential entries during each conversion to determine whether the page specified by the SPID is in real memory or not. I prefer to maintain a second control bit called a "continue" flag in each SPT entry. A cleared continue flag establishes the last entry which hashes to any preceding SPT index. Stated more formally, the continue flag is set in each location having a SPT index j equal to or greater than any initial index for an entry stored in a location having an index greater than j. All other continue flags are cleared. These inequality conditions must include modularity present in the establishing of the block of locations associated with each initial index. Thus, each time during a search operation an entry is examined which has a set continue flag, the next sequential entry may contain the desired SPID. If it is cleared the following entry cannot hold an SPID whose initial index is the current or a preceding sequential entry. When the search of the SPT encounters a cleared continue flag in an entry not containing the desired SPID, a page fault and the necessity of loading the referenced page into real memory is indicated.

In a dynamic paging situation one cannot predict the number of consecutive SPT entries which must be examined to determine whether a page is in real memory. Invalid entries, caused by either addition of pages to the free page queue or more commonly their actual overlay, are two reasons. Secondly, a set of 2 or more SPID's which hash to neighboring entries may be intermixed in any order depending on when they are entered in the SPT. Furthermore, the number of sequential valid entries which hash to each index location is in constant flux as pages are added to and removed from real memory. There are many ways to record an interruption in a sequence of possibly correct entries. The criteria I considered in selecting the continue flag approach include search speed, table maintenance speed, and capability to operate with multiple processors.

The continue flag is maintained in each SPT entry by the operating software which maintains the SPT, a 1 indicating the set and a 0 the cleared state. During address conversion, as each entry is gated from central memory 66, the continue flag is placed on data path 91. AND gate 93 receives the continue flag on path 91 and the EQ/NOT EQ output of comparator 78 on path 94. Since the AND gate 93 input receiving the continue flag on path 91 is an inverting input, a 1 on path 94 together with a 0 on path 91 produces a 1 on path 95. This is a page fault signal to the operating system software, in response to which the operating software moves the referenced page into central memory 66 from an external memory. In addition, the continue flag is applied to an inverting input of OR gate 92. A cleared continue flag produces a 1 at the output of OR gate 92 clearing flip-flop 72 and halting further searching of the SPT.

OR gate 92 also receives the K ≧ 32 page fault as one of its inputs. This also produces a 1 output from OR gate 92 on path 107 and causes flip-flop 72 to be cleared.

Although the conditions represented by the inputs on paths 87, 91 and 96 to OR gate 92 halt operation of the SPT search loop, each still must be dealt with further so as to complete the address conversion process which has reached the specified impasse. These further operations are not specifically part of this invention but an understanding of them will clarify certain aspects of it. If the appropriate randomness in the initial index is present, there almost certainly will be invalid entries within these 32 SPT locations beginning with the initial index for the SPID. An operating system can modify the SPT by paging out an entry among these 32 with a cleared valid entry flag. If no cleared valid entry flag is present among the 32 entries, then an SPT entry with a set valid entry flag, located within the 32 SPT locations for the SPID can be paged out. This occurrence should be very rare if the preferred 3 or 4 to 1 ratio of SPT locations to number of real memory page frames and substantial randomness in the SPIDs is maintained. It almost certainly is a result of improper choice of page numbers in the PVA. The user should be notified, so as to allow him to more wisely select these values.

The page fault on path 95 simply means that the needed page isn't in real memory. As will be explained below, this is remedied by simply loading the desired page into central memory 66 and updating the SPT to reflect this fact.

Although SPT and page maintenance is not within the scope of this invention, an understanding of them will further clarify it. Page-in must be accompanied by updating the SPT. In the preferred embodiment, software accomplishes this operation. The method to do this is to sequentially search forward in the SPT from the initial entry for the SPID involved, testing each entry until finding one containing a cleared SPID. The new SPT entry for the page to be loaded into real memory is inserted at this location. This procedure must include an entry counter to assure that the location selected for the new entry is within 32 locations of the entry's initial index, and trigger corrective action if it is not. A new page frame is selected by examining the free page queue. The selected frame is prepared for a new page by copying the page currently in the frame, into the old page's backup location if it has been changed. The new page is then loaded into this page frame, and its SPID and its page frame address are inserted in the selected SPT entry. The SPT must be updated by clearing the SPID field of the location occupied by the SPT entry of the overlaid page. Continue flags in the SPT may require alteration because of these manipulations. Algorithms have been devised to accomplish this, but won't be described here.

SPT search time can be decreased by assuring random initial indices produced by the hashing algorithm. If similar inputs produce similar or identical indices, or random inputs tend to produce bunched indices, relatively long strings of valid entries will be produced, increasing search times. The exclusive OR operation on the ASID and the page number is quite good at producing randomized indices so long as there is randomization throughout at least one of the two bits in each bit position. Although this is not easy to always guarantee, a good approximation can be achieved by proper choice of the ASID's and page numbers used. Users are expected to use page numbers within a segment in more or less sequential order. If it is necessary or convenient to separate portions of a user's address space, the separation should be achieved by using additional segments, rather than skipping blocks of page numbers. This guarantees low order randomness of the initial SPT index formed from an SPID during hashing. The software which assigns ASID's to the segment numbers is designed to make the left-most digit of the ASID which forms part of the initial SPT search index the units place, with radix exponents increasing positively to the right, in mirror image to the page number radix exponents. This insures that substantial randomness is present in the high order bits of the initial SPT index. The software can reference SPT length register 84 to determine which of the ASID's digits juxtapose to the SPT base address. It is equally possible to interpose bit transposition hardware on data path 16a if the ASID's are maintained in conventional low-order digit-to-the-right format. However, the software approach of keeping the process segment table with entries having units digits to the left is cheaper and reduces hardware requirements. Another approach would be for ASID's to be generated by a pseudo-random number algorithm of the type which produces no duplicate numbers.

There are important refinements to the preferred embodiment which should be mentioned. First of all, it is obvious that an addressing scheme which requires at least two memory references for each memory access will not operate with the desired speed. Experience shows that almost every given sequence of a few tens or hundreds of memory accesses will involve only a few system pages. The control hardware is designed to preserve the page frame addresses for the most recently accessed pages in a set of associative registers. This allows very rapid reference to such addresses. This expedient is well-known in the art and is discussed in *Introduction to Virtual Storage in System 370*, p. 40. While the associative registers are being searched, setup for searching the SPT also occurs, and is terminated if the desired address is found in the associative registers. *Introduction* also discusses an algorithm used for selecting SPT entries to held in the associative registers. Much the same algorithm is used in the processor employing the invention.

What I claim is:

1. Memory addressing apparatus for converting, responsive to a start signal, a system page identifier specifying a virtual memory page to a real memory address specifying the real memory location of the page, comprising
    (a) a memory having an output data path and storing a system page table having a plurality of sequential locations having sequential indices, each location capable of storing an entry comprising a system page identifier and a real memory address, said memory supplying on the output data path responsive to receiving an index to the system page table, the contents of the table location specified by the index, said table when in use storing a plurality of entries substantially smaller in number than the total number of table locations, each said entry being stored in one of a block of a predetermined number of contiguous locations and starting with an initial index for the system page identifier and which is a predetermined mathematical function of the system page identifier;
    (b) index generator means receiving the system page identifier for generating responsive thereto an output encoding the initial index as the predetermined mathematical function of the numeric value of the system page identifier, said mathematical function comprising generation of a preliminary index to an entry in the system page table, multiplication of the preliminary index by a predetermined integer, and selection of sufficient low order digits of the product to conform the size of the result to the size of the system page table indices;
    (c) entry retrieval means receiving the index generator means output encoding the initial index for, responsive to the start signal, supplying sequentially the entries within the block of locations starting at the initial index received from the index generator means, each such entry being supplied responsive to one of a series of retrieval signals; and
    (d) comparison means receiving the system page identifier to be converted to a real memory address, for supplying a first retrieval signal to the entry retrieval means responsive to the start signal and receiving the entry retrieved responsive thereto, and for comparing the system page identifier to be converted to the system page identifier contained in the just-received entry, and responsive to equality therebetween supplying the real memory address stored in the just-received entry as the desired real memory address, and responsive to inequality supplying another retrieval signal to the entry retrieval means.

2. The apparatus of claim 1, wherein the index generator means further comprises means for multiplying the preliminary index by a power of 2 to form the initial index.

3. The apparatus of claim 1, wherein the apparatus further provides a page fault signal indicating the absence in the system page table of an entry containing the system page identifier to be converted, and comprises;
    (a) a timer providing a clock signal a predetermined interval after each retrieval signal;
    (b) a counter receiving the start and clock signals, responsive to the start signal setting to a cleared state, incrementing by 1 responsive to each clock signal, and providing a counter signal indicating the counter contents; and
    (c) comparison means receiving the counter signal for, responsive to the contents of the counter equaling a predetermined number, issuing the page fault signal.

* * * * *